United States Patent [19]

Mitchell et al.

[11] 4,396,663
[45] Aug. 2, 1983

[54] CARBON COMPOSITE ARTICLE AND METHOD OF MAKING SAME

[75] Inventors: Robert W. Mitchell, Lawndale; Donald H. Leeds, Rolling Hills; Gary Baldelli, San Pedro, all of Calif.

[73] Assignee: The B. F. Goodrich Company, Akron, Ohio

[21] Appl. No.: 213,053

[22] Filed: Dec. 4, 1980

Related U.S. Application Data

[63] Continuation of Ser. No. 47,158, Jun. 11, 1979, abandoned.

[51] Int. Cl.³ ............................. B32B 5/12; D01F 9/14
[52] U.S. Cl. .................................. 428/111; 156/291; 156/222; 156/155; 264/29.1; 264/29.2; 264/29.5; 423/447.4; 428/195; 428/196; 428/246; 428/262; 428/280; 428/288; 428/360; 428/367; 428/395; 428/408; 428/902; 428/107; 428/272
[58] Field of Search .............. 428/260, 262, 287, 288, 428/289, 408, 367, 902, 107, 113, 296, 196, 198, 109, 108, 111, 246, 280, 360, 395; 423/447.1, 447.2, 447.4; 264/29.1, 29.6, 29.5, 29.6; 427/288; 156/155, 291, 296

[56] References Cited
U.S. PATENT DOCUMENTS
3,991,248 11/1976 Bauer ........................... 428/408

Primary Examiner—James J. Bell
Attorney, Agent, or Firm—James E. Brunton

[57] ABSTRACT

A carbon composite article and the method of making the article wherein selected carbon fibrous materials are formed into a basic starting substrate having a volume greater than the desired volume of the finished article. Very small amounts of a carbonaceous binder material are used to bond the fibrous materials together at a multiplicity of bonding sites. The basic substrate is then subjected to controlled temperatures and pressures to form a shaped substrate characterized by having a high degree of open porosity, a predetermined shape and structural integrity sufficient to withstand subsequent substrate processing. The carbonaceous binder is applied to the fibrous material in a manner whereby substantial encapsulation of the individual fibers is avoided so that the portions of the fibers disposed intermediate the bonding sites are free to move to accommodate and effectively distribute stresses which may be generated within the substrate due to material shrinkage or other process related causes. The shaped substrate is then partially or fully densified in a freestanding configuration by chemical vapor deposition of pyrolytic materials interstitially of the substrate.

16 Claims, 5 Drawing Figures

CARBON COMPOSITE ARTICLE AND METHOD OF MAKING SAME

This is a continuation of application Ser. No. 047,158 filed June 11, 1979 now abandoned.

BACKGROUND OF THE INVENTION

1. Field of the Invention

This invention relates generally to carbon composite products and the methods of making same. More particularly, the invention relates to a novel product manufactured by a process wherein a porous, rigidized shaped substrate, or preform, is formed from selected carbonized or graphitized fibrous materials which are bonded together under controlled conditions of temperature and pressure by small amounts of a carbonaceous binder. To complete the composite product, the substrate is controllably densified by the chemical vapor deposition of pyrolytic carbon interstitially thereof.

2. Discussion of the Prior Art

Excellent high temperature performance characteristics of carbon composites in structural, frictional, ablative and thermal insulation applications has caused an ever expanding demand for such materials. Accordingly considerable effort has been expended in recent years in developing new techniques for the large scale production of such materials for use in nuclear, aerospace, aircraft and industrial fields.

In producing carbon composite products, substrates or preforms, made up of carbon fibrous materials are first constructed. Two basic methods are typically employed to produce the substrates. In accordance with one method, sometimes called the resin bonding method, the fibrous substrate materials are bonded together using substantial amounts of carbonizable binder such a phenolic resin or the like. The methods described in the patent to Bickerdike et al, U.S. Pat. No. 3,233,014 is exemplary of the resin bonding method. In accordance with the second method, often called the Chemical Vapor Deposition or C.V.D. method, the fibrous substrate materials are bonded together by the interstitial deposition of pyrolytic carbon using known chemical vapor deposition (C.V.D.) techniques. The patent to Bauer, U.S. Pat. No. 3,895,084 clearly describes the C.V.D. method. Also pertinent to this method is the British Pat. No. to Williams, 1,455,891.

The resin, or carbonaceous binder method has certain recognized advantages. For example, using this method, durable, high density structurally stable preforms can readily be produced using conventional molding and press bonding techniques. The preforms formed by this method can conveniently be shaped and are easily handleable. Drawbacks of the resin binder method, however, include the fact that the method is relatively expensive requiring several preparatory processing steps including pre-impregnation of the substrate materials, "B" staging and binder carbonization. Additionally, difficulties have been experienced using this method in achieving acceptable compatability between fiber and binder processing shrinkages, and in routinely producing preforms which retain acceptable part integrity during the various substrate processing steps without delaminating or microcracking. In a similar vein, the relatively high quantities of carbonizable binder necessary to produce an acceptable carbonizable substrate frequently pose debulking, outgassing and dimensional stability problems during carbonization of the binder. A frequent objective of the resin bonding method is to totally encapsulate the individual fibers of the substrate in an attempt to eliminate undesirable voids in the substrate.

The C.V.D. method, wherein substrate bonding is accomplished by depositing onto the fibers of the substrate carbon resulting from dissociating methane or other carbon bearing source gasses, also has several recognized advantages. For example, this technique produces a substrate having maximum open porosity so as to permit precisely controllable partial or complete substrate densification. Additionally, inherent in the method is the fact that each fiber of the substrate is uniformly coated with the deposited material rendering it substantially impermeable and unusually resistant to corrosion even at high temperatures. Further, the thickness of the coating on the fibers themselves and at the fiber crossover points can be precisely regulated so as to achieve the desired substrate rigidity.

A major disadvantage of the C.V.D. method is that some form of expensive and often bulky shaping fixture is required to hold the substrate materials in the desired configuration until sufficient pyrolytic carbon has been deposited to rigidize the fibrous structure. Such hardware is expensive, reduces furnace productivity substantially since it occupies a significant portion of the severely limited furnace processing volume, and presents significant assembly and disassembly problems.

As will become apparent from the discussion which follows, the method of the present invention permits realization of the advantages of both the resin and C.V.D. methods while substantially avoiding the disadvantages of each method.

SUMMARY OF THE INVENTION

In summary, the present invention pertains to a unique composite article and the novel method of fabricating the article. A particularly novel facet of the method of the invention relates to the construction of an open porosity, rigidized fibrous substrate, or preform, adapted to be controllably densified by the chemical vapor deposition process. The technique consists of employing extremely small amounts of a carbonaceous binder material to selectively bond the individual fibers of the substrate together at multiple sites while avoiding total encapsulation of any individual fiber or of all the fibers in the substrate mass. Thus the fiber to fiber bonding achieved at the multiple bonding sites tends to rigidize the fibrous substrate without eliminating the highly porous nature of the fibrous mass which comprises the substrate. An important feature of the bonded substrate of the present invention is the ability of the nonencapsulated fiber filaments disposed between the bonded sites to move to accommodate and distribute stresses generated by material and resin binder shrinkages. This ability to accommodate such stresses or shrinkages substantially eliminates the microcracking and delamination defects associated with conventional, or fully encapsulated, resin bonded structures during subsequent carbonization or heat treatment processing steps.

In accordance with the method of the invention, suitable resin can be applied to the fibrous material by surface spraying, roller brush application of resin in particulate form, electrostatic spraying, or by any other method for controllably applying small amounts of a carbonizable, organic binder material to the fibrous material without totally encapsulating the fibrous mass.

In the practice of the present invention resin amounts as low as 0.5 to 15% by weight when applied to the fibrous materials permit press bonding, molding, autoclaving and other conventional types of processing techniques to be used to successfully produce rigid, porous substrates, or preforms, suitable for direct C.V.D. infiltration. Because of the small quantity of organic resin binders used in the practice of the invention the binders are efficiently carbonized during the time the substrate is heated to C.V.D. infiltration temperatures thereby eliminating the need for a separate resin carbonization step. Of significant importance is the fact that substrate microcracking, delamination, debulking, skrinkage, and void encapsulation problems normally associated with conventional resin laminating processes in which full fiber encapsulation by the resin matrix is employed, are effectively minimized due to the small amounts of resin used and the substantial open porosity of the rigidized substrate.

The method of the present invention can be successfully carried out using both thermally stable (fully carbonized or graphitized) and partially carbonized (stabilized or preoxidized) fibers. No special matching of the resin matrix to fiber volumetric shrinkages, as suggested in U.S. Pat. No. 3,728,423, is required to produce defect-free substrates or composites in accordance with the present invention. Similarly fiber surface activation as discussed in the aforementioned patent is not necessary to achieve adequate matrix to fiber bonding. Since, in the substrates of the present invention, the resin bond sites constitute only 0.5% to 10% of the fiber surface area available for bonding and essentially are a transient bond, surface activation is not required. As will be discussed in great detail hereinafter, the majority of the matrix to fiber bonding in the substrate of the present invention is accomplished by deposition of pyrolytic carbon on and between the uncoated (nonencapsulated) substrate fibers during the initial C.V.D. infiltration step. The pyrolytic carbon matrix to fiber bonding thus produced provides more than adequate substrate strength and rigidity.

In carrying out the method of the invention mixtures of various types of fibers can be used to produce hybrid type substrates or a single type of fiber can be used to produce conventional types of substrates. In either case, fiber volume ranges of between 5 to 80% (by weight) have been found to produce defect-free substrates using the methods of the invention. Precise fiber volume control is readily achieved by controlling the pressures applied to the substrate during the substrate shaping step. Additionally, thickness, or fiber volume control can readily be achieved through the use of mechanical means embodying spacers or "stops" of predetermined thickness. Further, desired substrate pore size distribution and uniformity can be realized by proper selection of resin and substrate shaping techniques.

Through the use of particulate, hot melt thermoplastic resins as the binder material, the significant safety hazards associated with the use of solvent based liquid resin systems are virtually eliminated. In addition, the use of such resins permit precise control of bond site spacings and bonding areas within the substrate. Furthermore, the troublesome evolution of water and volatiles associated with the curing of other type resins is effectively eliminated by the use of polyimide resins.

Another important aspect of the present invention resides in the fact that the methods of the invention can effectively be used to augment the thermal plastic fiber bonding techniques disclosed in the copending U.S. patent application Ser. No. 518,418, filed by one of the inventors named herein.

In the light of the foregoing, it is an object of the present invention to provide a novel method of making a carbon composite article in which a wide variety of fibrous materials can be used to construct a precursor substrate having uniform pore size and distribution which can be controllably densified in a freestanding configuration by deposition of pyrolytic material interstitially of the substrate.

The method of the invention is specifically designed to produce a unique precursor substrate which exhibits substantial open porosity, a degree of structural integrity sufficient to permit handling and subsequent processing and a predetermined fiber volume.

More particularly it is an object of the invention to provide a method as described in the previous paragraph in which, in constructing the substrate, very small amounts of a carbonaceous binder material in either particulate or liquid form are used to bond the fibrous materials together at a multiplicity of bonding sites.

It is another object of the invention to provide a method as described in the preceeding paragraph in which substantial encapsulation of the fibers within the binder material is carefully avoided so that the portions of the individual fibers located between the bonding sites are free to move to accommodate and distribute stresses generated within the substrate due to material shrinkage and other process related causes.

It is still another object of the invention to provide a method of the character described in which the shaped substrate is sufficiently rigid so that it can be controllably densified by interstitial deposition of pyrolytic material by vacuum furnace processing without the need for holding fixtures or other means for supportably constraining the shape of the substrate.

It is another object of the invention to provide a novel method for the construction of basic substrates of the class described in which fibrous material in numerous forms can be used, including fabrics, tows, mats, felts, chopped fibers or milled fibers. The fiberous materials may be partially or fully carbonized or graphitized and may comprise cellulosic, polyacrylonitrile or pitch type precursor materials.

It is another object of the invention to provide a novel method for the construction of shaped substrates of the class described in which various carbonaceous binder materials can be used including polysacharides and phenolic, polyimide, polyamide, furfural or pitch resins.

It is still another object of the invention to provide a method of making carbon composites in which, by eliminating the need for holding fixtures, maximum use of available vacuum furnace capacity can be made thereby significantly increasing furnace output rates and markedly lowering processing costs.

It is yet another object of the invention to provide a method of the character described in the preceeding paragraphs in which the carbonaceous binder material is safely carbonized during the densification step thereby eliminating the need for a special binder carbonization step.

It is a further object of the invention to provide a method of the aforementioned character in which partially carbonized, fully carbonized, or graphitized fibrous substrate materials can be used without the necessity of matching volumetric shrinkages of the fibers and carbonaceous binders to achieve acceptable precurser substrates.

It is another object of the invention to provide a method of the class described which permits a substantial portion of the pyrolytic carbon deposited in the initial densification step to be deposited on the surface of the fibers of the fibrous substrate material thereby producing a partially densified substrate having high structural integrity.

A further specific object of the invention is to provide a method of producing a polyacrylonitrile precursor, or shaped substrate, in which a carbonaceous binder is used in very small quantities to augment the thermoplastic bond naturally formed at the crossover points of the fibers upon properly subjecting the substrate to controlled elevated temperatures and pressures in accordance with the methods disclosed in copending application Ser. No. 518,418.

It is yet another object of the present invention to provide a novel composite article made up of a multiplicity of intercrossing fibers which are joined together at spaced apart bonding sites by a carbonaceous binder material, each of the individual fibers being uniformly coated with a pyrolytic material and adjacent fibers being further joined together at their crossover points by a coating of pyrolytic material.

It is another object to provide a novel composite article make up of a multiplicity of intercrossing stabilized PAN fibers in which the adjacent fibers are interlocked together by mating deformations formed in the fibers at their crossover points, by a carbonaceous binder material located at a multiplicity of spaced apart bonding sites, and by a coating of pyrolytic material substantially encapsulating said fibers at their crossover points within the article.

Finally it is an object to provide a composite article of the aforementioned character having superior mechanical properties including high interlaminer shear strength, high edge flex strength and high flat flex strength.

These and other objects of the invention are realized by a unique method and the product thereof comprising the steps of selectively depositing a carbonaceous binder material onto the fibers of a compressible fibrous material; constructing a basic substrate from the fibrous material, the volume of the basic substrate being greater than the volume of the final product; subjecting the basic substrate to controllable external pressures at a predetermined elevated temperature to compress the basic substrate into a shaped substrate having a known volume and a shape substantially corresponding to the shape desired of the final product, whereby the fibers are bonded together at a multiplicity of spaced apart bonding sites, the fiber portions disposed intermediate the bonding sites being free to move in response to stresses imparted to the shaped substrate; subjecting the shaped substrate in a free standing configuration to elevated temperatures while controllably depositing pyrolytic material interstitially thereof, whereby the carbonaceous binder material is carbonized and said fibers are permanently bonded together by the pyrolytic material, and continuing the interstitial deposition of pyrolytic material until the desired final product density is achieved.

DESCRIPTION OF THE PREFERRED EMBODIMENTS

Figure 1:
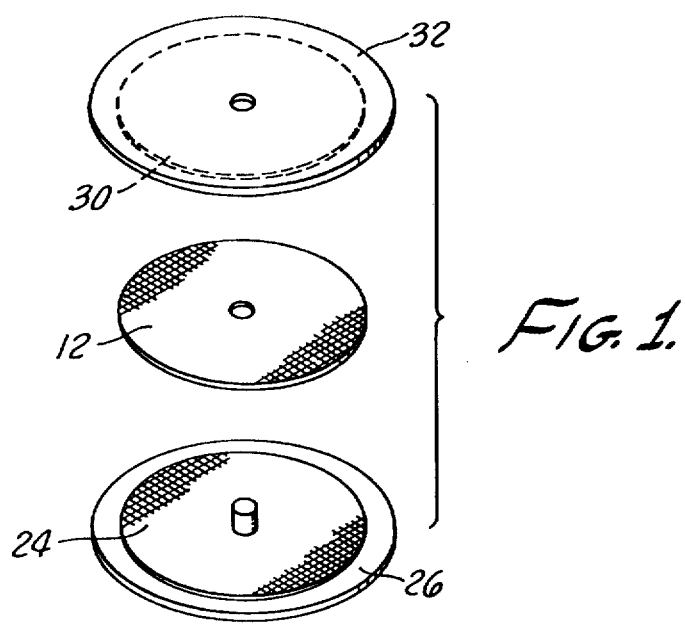
FIG. 1 is a perspective, exploded view illustrating the method of assembly of fibrous material onto pressing platens.

Before proceeding with a detailed discussion of the preferred embodiments of the present invention, the following definitions of the technical terms used herein are presented to facilitate a clear understanding of the nature and scope of the invention:

1. Carbon composite product—a product consisting of a fibrous material, the fibers of which may be oxidized stabilized, partially carbonized, fully carbonized or graphitized, a carbonaceous binder material and a pyrolytic material deposited interstitially of the fibrous material.

2. Thermoplastic fibers—fibers having the property of softening when heated and of hardening again when cooled.

3. Basic or precursor substrate—as used herein, the starting substrate or interim product shape before compressing the substrate into a shaped substrate.

4. Shaped substrate—the pressed or formed basic substrate suitable for pyrolysis or densification with pyrolytic material.

5. Carbon fibrous substrate—the shaped substrate after pyrolysis ideally suited for interstitial deposition of pyrolytic carbon or a similar material.

6. Carbon fiber—carbon material in fibrous form.

7. Carbonaceous binder—a material adapted to bond together the fibers of the shaped substrate at selected bonding sites without encapsulating a substantial portion of the fiber. Various resin materials including thermoplastic resins have proven satisfactory as the binder material.

8. Pyrolytic material—the material formed by pyrolysis, that is chemical decomposition by heat. Various pyrolytic materials may be used in the densification step of the present invention including pyrolytic carbon, pyrolytic graphite, certain nitrides such as boron nitride, certain refractory metals such as tantalum, tungsten, molybdenum and columbium, as well as certain carbides including tantalum carbide, niobium carbide, zirconium carbide, hafnium carbide and silicon carbide.

9. Carbonaceous gas—a carbon containing gas.

10. Polyacrylonitrile fibers—synthetic polymeric fibers.

11. Oxidized, or otherwise stabilized polyacrylonitrile fibers—black fibers formed by suitable oxidation or other chemical modification of polyacrylonitrile fibers under tension.

12. Fiber volume—volume of fibers present in the given substrate.

13. Non-woven—coherent fibrous material formed without uniform interlacing of threads such as batting or felt.

14. Woven—fabric formed by interlacing warp and filling threads on a loom, or the like.

As will be clearly illustrated by the examples which follow, the method of the invention stated in simple terms comprises the following steps: First, a small quantity of a suitable carbonaceous binder such as phenolic resin, polyimide resin, or a like material is applied to a selected carbon fibrous material. The binder can be applied to the material by hand sprinkling, through use of a roller brush, by surface spraying, or by other similar means. Next, the fibrous material is assembled into a basic or starting substrate having a volume greater than the volume of the end product. The basic substrate is then subjected to controlled temperatures and pressures to form a shaped substrate which has a high degree of open porosity, a known volume and a shape substantially corresponding to the shape of the desired end product. During this "press bonding" step the individual fibers of the carbon fibrous material are selectively bonded together by the binder material at multiple sites. These bonds or "tacks" rigidize the substrate so that during the subsequent processing steps it can be readily handled in a free standing configuration. Finally, the shaped substrate is partially, or fully densified in a freestanding configuration by chemical vapor deposition of selected pyrolytic materials interstitially of the substrate. The various pyrolytic materials which may be used are set forth in Example 3 which follows.

Depending upon the particular starting material and binder used, an interim carbonization step may be required. This carbonization step preceeds the densification step and functions to controllably carbonize the binder and, in some instances, the fibers which make up the basic substrate. Additionally, for some applications either an interim or final heat treating step is undertaken.

Referring to the drawings, and particularly to FIG. 1, one embodiment of the method of the present invention comprises the steps of first cutting a carbon fibrous fabric material having a multiplicity of interwoven fibers into pieces having a predetermined size and shape. The fabric material may be constructed from fibers of wool, rayon, polyacrylonitrile (PAN) or like materials and may be cut into annular shapes 12 of the character shown in FIG. 1, or into pie shaped segments, rectangles or other suitable configurations. The shape of the fabric "lay ups" is, of course, governed by the desired shape and end use in the final product being fabricated.

The next step in the method of the invention is to selectively deposit onto the fibrous material a very small quantity of a carbonaceous binder. Depending again upon the end use of the final product and the desired method of application of the binder, the carbonaceous binder material used may be a phenolic resin, a particulate polyimide resin such as "Kerimid 601" distributed by Rhodia, Inc. of New Brunswick, N.J., a furfural resin such as "Karbon 700R" distributed by Fiberite, Inc. of Winona, Minn., or various other binder materials well known to those skilled in the art.

The binder material may be diluted with a solvent such as isopropyl alcohol and then sprayed onto the fibrous material, or it may be sprinkled onto the fibrous material by hand or through the use of various types of mechanical dispensing apparatus.

Figure 2:
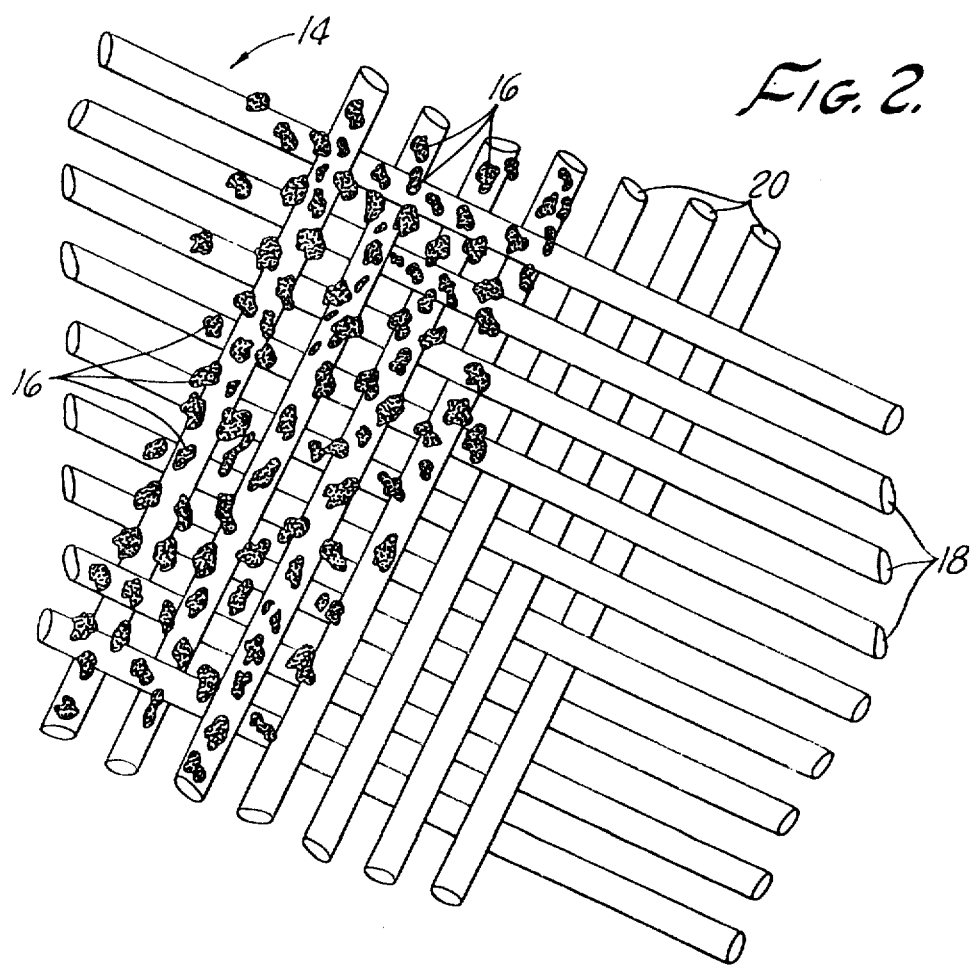
FIG. 2 is a greatly enlarged, fragmentary view of a portion of a woven fibrous material made up of warp and fill yarns onto which particles of a carbonaceous binder material have been selectively deposited.

Turning to FIG. 2, there is schematically illustrated in greatly enlarged perspective, a fabric material 14 such as PAN 8 harness satin manufactured by Hercules, Inc., as it appears after a limited quantity of particulate binder material 16 has been deposited thereon. It is to be observed that the fabric material is made up of warp yarns 18 and fill yarns 20 which are interwoven together to form the fabric. Only a limited amount of binder is deposited on the fabric surfaces at spaced apart bonding sites along the warp and fill yarns. Great care is exercised in depositing the binder material to make certain that during subsequent heating steps, substantial encapsulation of the individual fibers will not occur. This is necessary so that the portions of the fibers intermediate the bonding sites will be free to move to accommodate and effectively distribute stresses which may be generated during subsequent processing steps.

Figure 3:
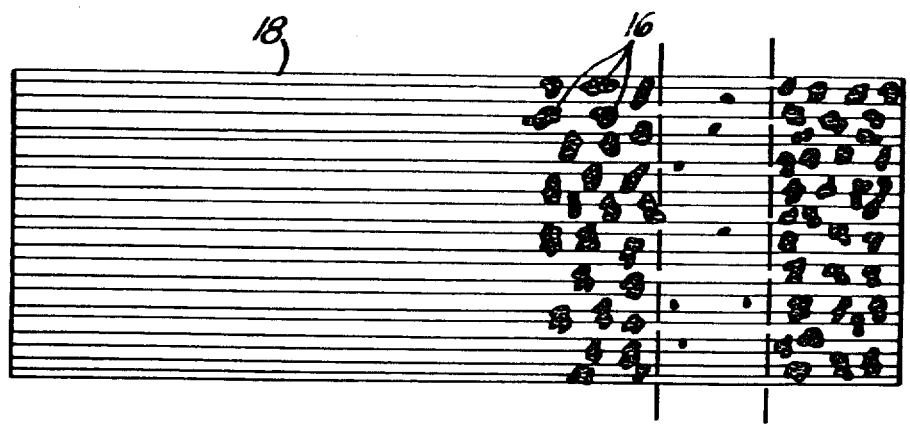
FIG. 3 is a top view of the appearance of a single yarn pulled from a fabric of the character illustrated in FIG. 2, showing deposition thereupon of the carbonaceous binder material.
Figure 4:
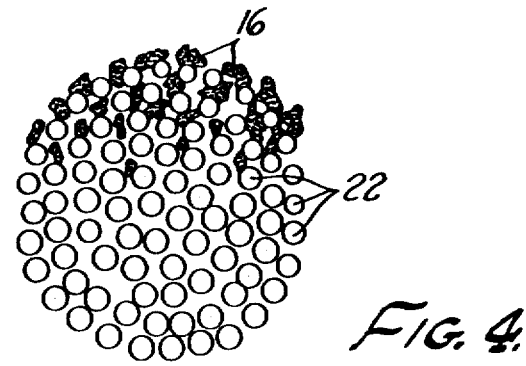
FIG. 4 is a cross-sectional view of a single yarn pulled from a fabric of the character shown in FIG. 2 illustrating the infiltration of the binder material among the individual filaments which make up the yarn.

Referring to FIGS. 3 and 4, there is illustrated the appearance of a single warp yarn 18 pulled from the fabric shown in FIG. 2. Each warp yarn 18, as well as each fill yarn 20, is made up of a multiplicity of filaments 22. As best seen in FIG. 4, when the particulate binder material 16 has been properly deposited onto the fabric, only small amounts of the binder will infiltrate between the individual filaments. As previously mentioned, the amount of binder material used is severely limited so as to avoid covering the entire outer surfaces of the individual yarns which make up the fabric. This approach is, of course, in direct contradistinction to the teaching of the prior art wherein complete encapsulation of the yarns of the fabric is deemed highly desirable in the fabrication of composite articles.

Turning again to FIG. 1, the next step in the method of the invention is to construct a basic substrate from the fibrous material upon which the binder material has been deposited. In the form of the invention shown in FIG. 1 this is accomplished by first placing a disc of fabric 24 onto a large metal plate 26. Disc 24 is free of binder material so as to facilitate separation of the substrate from the plate 26. Subsequent discs 12, upon which the binder has been deposited, are then placed over disc 24 in a predetermined orientation, as for example a rotational offset of 22.5 degrees from the preceeding layer. After a predetermined number of layers of the fabric material have been assembled, a binder free disc 30 is placed over the upper most piece of material and a second metal plate 32 is placed on top of the assembly.

The basic substrate thus formed, along with the metal plates 26 and 32, are placed into a press which is provided with heated press platens. The press and press platens used in the forming of the shaped substrate is of standard design and its construction and operation need not be described in detail herein.

The basic substrate is carefully constructed so that is has a volume greater than the desired volume of the final product, has a known fiber volume and contains a predetermined, limited amount of binder material. The actual fiber volumes and binder weight percent ranges used in the practice of the invention are illustrated in the examples which follow.

In forming the shaped substrate, the basic substrate is subjected to controllable external pressures of up to 5000 psi at predetermined temperature ranges of up to several hundred degrees Fahrenheit. The shaped substrate formed in accordance with the methods of the invention has a known volume, a known fiber volume, and has a shape substantially corresponding to the shape desired of the final product. The various temperature and pressure ranges actually used in the shaping step are illustrated in the examples which follow and are selected so as to controllably compress the basic substrate a predetermined amount and to cause the individual fibers thereof to be bonded together at the multiplicity of spaced apart bonding sites.

Following the shaping step, the shaped substrate is removed from the metal plates and is placed in a freestanding configuration into a vacuum deposition furnace for densification with a selected pyrolytic material such as pyrolytic carbon. The densification is accomplished by well known chemical vapor deposition (CVD) techniques. The various temperature and pressure ranges suitable for the CVD densification step are set forth in the previously identified British Pat. No. 1,455,891.

Because the fibers of the shaped substrate are selectively bonded together by the binder material at a multiplicity of spaced apart bonding sites, the shaped substrate is suitably rigid to retain its shape during the densification step without the necessity of using bulky holding fixtures to constrain it in the desired configuration. This permits maximum use of valuable furnace space and constitutes a significant cost saving over typical prior art furnace processing methods. Additionally, and most importantly, because the individual fibers are not encapsulated in the binder material, the portions thereof which are disposed intermediate the bonding sites are free to flex and move to accommodate and distribute external stresses. Accordingly, no special matching of the binder matrix to fiber volumetric shrinkages is required to produce defect free fully or partially densified end products. Such a unique and important result is nowhere described or suggested in the prior art.

During the CVD densification step, the binder material within the shaped substrate is fully carbonized. Simultaneously, the transient binder material fiber bonds are augmented by permanent fiber bonds formed by the pyrolytic material which has been deposited interstitially of the substrate.

Examples Illustrating Several Methods of the Invention

EXAMPLE NO. 1

Panels of fully carbonized PAN fabric of both 8 Harness-Satin (8 H/S) and knit types, were cut into several 11.30 inch circular discs. Binder material in the form of a phenolic resin manufactured by Monsanto Chemical Co. and designated SC 1008 was diluted with isopropyl alcohol in a 3:1 ratio for application. The resin solvent mixture was then sprayed on each side of each disc using a standard type of spray gun. The discs were then air dried for 24 hours at ambient temperature. Next, the discs were reweighed and the extent of resin pick-up was determined. Nominal resin pick-ups by weight were found to be 6.25 percent and 5.3 percent respectively for the PAN 8 H/S and knit discs.

Each disc was then cut into 45° segments having an outside diameter (OD) of 10.30 inches and an inside diameter (ID) of 3.85 inches. Segments were laid up on a large aluminum plate having a graphite center "spud" or post. Each subsequent layer (4 segment group) was rotationally offset 22.5° from the preceeding layer. Uncoated graphite fabric was used as a release layer on each side of the coated material. A second aluminum plate was placed on top of the laid-up material prior to insertion of the basic substrate in the press. The aluminum sheets were used as "caul" sheets to prevent any possibility of the material bonding to the heated platens.

The fabric assemblies or basic substrates were compressed using a 350 ton press provided with heated platens. Press platens were heated to 250° 1 F., materials were inserted, and the press was closed. Platen temperatures were maintained at 250° F. until thermocouples disposed within the material indicated that a temperature of 250° F. had been reached within the substrate. Platen temperatures and the material temperature were then increased to 350° F. The material was held at 350° F. for 10 minutes and then cooled down over a period of one hour. Pressure on the parts was maintained at 350 pounds per square inch (PSI) throughout the pressing cycle.

Rigidized preforms, or shaped substrates, were obtained. Fiber volumes associated with the PAN 8 H/S and PAN knit preforms were respectively 27.9 percent and 24.7 percent. Preform density levels were 0.531 grams per cubic centemeter (gm/cc) (8 H/S) and 0.467 gm/cc (knit). Preform quality as determined both visually and by x-ray analysis was excellent. No delaminating or microcracking were observed.

Both shaped substrates were then subjected to a CVD processing cycle where resin carbonization, additional fiber bonding, and preform densification were achieved simultaneously. Dimensional changes, OD and ID, were minimal (0.04–2.2 percent). Major thickness expansion in both the PAN 8 H/S and PAN knit preforms did, however, occur. Respective preform thickness changes were 35.7 percent and 37.7 percent. Corresponding fiber volumes (reductions) were 20.4 percent and 18.2 percent. Calculated resin char contents, by volume, were respectively 0.9 percent and 0.65 percent. Densified preform (composite) quality was excellent. No delaminating or macrocracking were observed. Thus, the major changes in thickness and fiber volumes observed were successfully accommodated without structural degradation. A high degree of substrate open porosity was maintained and uniformly increased.

Additional CVD processing resulted in final product, carbon/carbon composites with densities of 1.782 gms/cc (PAN 8 H/S) and 1.760 gm/cc (PAN knit). Final composite quality was excellent (structurally sound) and mechanical property levels were highly acceptable.

EXAMPLE NO. 2

Full graphitized (rayon precursor) graphite 8 H/S fabric was processed in exactly the same manner as were the PAN fabrics described in Example No. 1. Resin content, however, was 10 percent. Press cured preform characteristics were as follows:
Fiber volume 52.9%
Preform Density 0.868 gm/cc
Percent Preform Void Content 40.9%
Preform X-Ray Quality Very Good Preform densification, resin carbonization, and additional fiber bonding were again accomplished in the initial CVD processing cycle. Composite integrity as defined by visual and x-ray analysis was excellent. One additional CVD cycle was employed to further densify the composite to 1.484 gm/cm³.

EXAMPLE NO. 3

PAN knit fabric produced by Stackpole and heat treated at 1600° C. was cut up into 7 inch by 5 inch rectangular panels and each was coated with a binder in the form of particulate (powdered) polyimide resin manufactured by Rhodia Incorp., and designated as Kerimid 601. The fabric panels were assembled into a basic substrate and, as previously described, were press bonded into a rigidized, porous shaped substrate for densification by CVD processing. Resin application was accomplished by hand "sprinkling" the powdered resin uniformly on the surface of each panel utilizing an ordinary flour sifter. Microscopic examination of the fabric surfaces revealed that granules of resin were concentrated primarily upon the fibers and yarns located at the surfaces of the fabric. Furthermore, the yarn bundles and filaments at the surface of the fabric appeared to be only 30 to 35 percent covered by the particulate resin. In addition, resin penetration, both within the fabric fiber bundles and between the individual filaments in a given bundle, was found to be minimal (see FIGS. 3 and 4).

Forty-four coated panels (layers) were stacked, one on top of another, to form the basic substrate. Fiber, or fabric weight was 226 grams. Resin weight on the fabric panels was 34 grams resulting in an initial resin content by weight of 13.1 percent.

Press bonding of the basic substrate into the shaped substrate was accomplished in a 350 ton press employing mechanical stops (graphite spacers) designed to limit compaction to 30 percent fiber volume. The stacked layers were inserted into the preheated (250° F.) press platens, "stops" were installed, and the press was closed applying sufficient pressure to seat the platens on the "stops". Platen and material temperatures were then increased to 360° F. over a 0.5 hour period. The platens and material were maintained at 360° F. for one hour prior to opening the press and removing the preform. No cool-down of the preform was employed before removal from the press.

The shaped substrate thus formed was rigid, flat, resin flash free, and well bonded. Part integrity as determined by x-ray analysis techniques was found to be excellent. Striated (light/dark) density lines parallel to the fabric planes were observed suggesting considerable open porosity between the well bonded adjacent fabric layers.

Substrate densification was then initiated using standard CVD techniques. A carbonaceous source gas comprising primarily methane was used as the deposition gas. No post curing, carbonization, or heat treatment of the preform was undertaken.

Although methane was used as the source gas, various pyrolytic materials may be used in the densification step including certain nitrides such as boron nitride, certain refractory metals such as tantalum, tungsten, molybdenum and columbium as well as certain carbides including tantalum carbide, niobium carbide, zirconium carbide, hafnium carbide and silicon carbide. The techniques of substrate densification using these materials are well known to those skilled in the art and are described in the literature.

Examination of the partially densified shaped substrate revealed that a thickness expansion of 14.8 percent, with a corresponding fiber volume reduction of 12.0 percent, had occurred during the initial CVD densification cycle. Part integrity level or quality as determined by both visual and x-ray analysis was excellent. No evidence of any detectable amounts of microcracking or delaminating was found. Once again it was obvious that the major dimensional changes which had taken place within the substrate were effectively accommodated without any resulting structural degradation.

Subsequent CVD densification processing produced a final product having a density of 1.79 gm/cc and a highly uniform thickness density gradient. No adverse effects were noted with respect to densification rates or final density level achievable. Both were comparable to those associated with prior art techniques for densifying fully fixtured fiber substrates by direct CVD bonding methods.

EXAMPLE NO. 4

Fully carbonized (1600° C.) PAN 8 H/S fabric was die cut into annular shaped sheets having an outside diameter of 16.5 inches and an inside diameter of 6.1 inches. Powdered Kerimid 601 resin was applied to one surface of each sheet using a mechanical sifting and dispensing apparatus. Fifty-six coated sheets were stacked, one upon another, and placed between two graphite plates. Resin content of the basic substrate was 16.7 percent by weight. The assembly was then vacuum bagged and placed in an autoclave. The vacuum bag was connected to a vacuum system for removal therefrom of any outgas products which may come off during processing. The autoclave was progressively heated from room temperature to about 340° F. over a 7.5 hour period. A pressure of 250 PSI was maintained in the autoclave during the entire cycle. Outgassing products were removed from the vacuum bagged assembly by the vacuum system operating at a vacuum of 24 inches of mercury. The autoclave was then cooled down to room temperature and then the vacuum bagged assembly removed.

A rigidized part having a fiber volume of 36.4 percent was produced by the autoclave process. Part quality, as determined by x-ray analysis, exhibited moderate high/low density ("banded") areas through the thickness profile. No delaminations, x-ray or visual, were observed.

The rigidized substrate was then CVD infiltrated without post cure, carbonization or further heat treatment. The CVD infiltrated substrate exhibited a 58.1 percent increase in thickness which reduced part fiber volume from 36.4 percent to 23.1 percent. Other dimensional changes were negligible. The substrate was examined visually and by x-ray techniques and exhibited no delaminating or microcracking. Thickness density striations ("bands") observed in the substrate after autoclaving were reduced in intensity. This marked improvement in quality, after the large change in substrate volume which was encountered, was totally unexpected. The ability of the substrate to withstand large processing dimensional readjustments while retaining structural integrity was once again demonstrated.

Further densification cycles produced a high quality carbon/carbon composite which exhibited a uniform density profile throughout its thickness.

Figure 5:
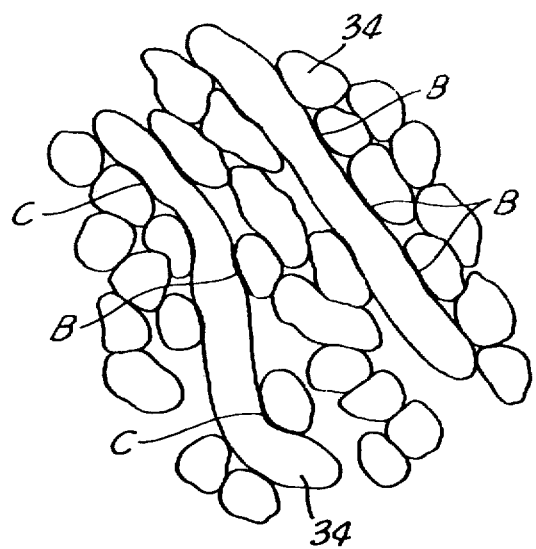
FIG. 5 is a very greatly enlarged diagrammatic view of a microscopic portion of a shaped substrate composed of stabilized PAN fibers illustrating the crimping of the fibers at their crossover points and showing the bonding together of the individual fibers by the binder material.

Referring to FIG. 5, there is schematically illustrated the internal fiber orientation of a unique double bonded substrate made by another method of the present invention. In this substrate, wherein oxidized stabilized PAN is used as a starting material, the thermoplasticity characteristics of PAN are advantageously used to form a secondary fiber bond which augments the bond formed by the carbonaceous binder. As more fully described in copending application Ser. No. 518,418, filed by one of the coinventors of the present invention, when compressed under controlled conditions of temperature and pressure, oxidized stabilized PAN fibers 34 will bond at their crossover points to form crimps designated by the letter "C" in FIG. 5. These crimps tend to securely interlock the fibers together and substantially augment the fiber bonds formed at the multiplicity of the spaced apart bonding sites designated by the letter "B" in FIG. 5.

The particular temperature and pressure ranges which are required to form this novel double bonded shaped substrate are illustrated in the examples which follow.

EXAMPLE NO. 5

Partially carbonized, oxidized stabilized PAN 8 H/S fabric was die cut into annular shaped sheets having an outside diameter of 16.5 inches and an inside diameter of 6.1 inches. The fibers of the fabric were preoxidized stabilized by heating them to a temperature of about 220° C. in the presence of oxygen. Fifty-six sheets were resin spot coated on both sides with a resin manufactured by Fiberite Corp. of Winona, Minn. and identified as Karbon 700R resin (56.7 percent solids). The spot pattern used consisted of ¼ inch diameter holes on a two inch center-to-center equilateral triangle. The fifty-six sheets were assembled into a basic substrate having a resin content of 0.9 weight percent. Two additional substrates having resin contents by weight of 1.3 and 2.0 percent were also constructed each using 56 sheets. Forming of the basic substrates was accomplished by applying 50 PSI pressure on the basic substrates, heating the substrates from room temperature to about 300° F. to 350° F., holding them at this temperature for 2 hours, increasing the pressure to about 750 PSI, holding the substrates at about 350° F. to 410° F. and 750 PSI for 2 hours, and finally cooling them to 120° F. prior to their removal from the press. Shaped substrate fiber volumes of 66.7 percent to 68.6 percent were achieved.

Fiber and resin carbonization of the shaped substrates was accomplished during a 5 day carbonization cycle wherein the temperature was raised progressively from room temperature to 1400° F. Significant dimensional changes (OD, ID, and thickness) took place during carbonization. Fiber volume reductions to a range of 43.6 to 46.7 percent were observed with substrate weight reductions of 39.1 to 39.3 percent.

Fiber and resin heat treatment to 1600° C. was accomplished in a furnace cycle to fully carbonize, purify, and provide dimensional stability to the substrates prior to densification by the CVD process. Minor additional dimensional changes were experienced resulting in a fiber volume range of 39.5 to 41.0 percent for the 1600° C. heat treated preforms.

Shaped substrate quality after carbonization, and fiber heat treatment was determined to be excellent by both visual and x-ray techniques. Low density areas and delaminations, sometimes observed in substrates not having supplemental resin bonding were virtually eliminated. The ability of the fibers to freely move between the resin bonded sites and to distribute processing stresses eliminated delaminating and microcracking. Augmentation of the resin bonds by the thermoplastic bonds appeared to substantially aid in the elimination of such problems during processing.

Subsequent densifications of all three ¢warm pressed"/resin spot bond augmented preforms was accomplished routinely without any adverse effects on part quality levels.

EXAMPLE No. 6

Two cylindrically shaped basic substrates having an 11 inch external diameter, a 2½ inch internal diameter and a height of 7½ inches were constructed from 150 layers of Stockpole stabilized (Pyron ®) PAN Knit fabric. Prior to constructing the basic substrate, powdered solid Kermid 610 polyimide resin was lightly sprinkled uniformly over the surfaces of each sheet. The basic substrate was then compressed at about 100 tons pressure at a temperature of between about 300° F. and about 410° F. (center stack contact pyrometer temperature) for a period of about 4 hours. The shaped substrate thus produced was about 2.7 inches in height and had a fiber volume of about 34 percent. Mechanical stops were used to achieve the desired volume percent fibers in the final composite. The correct height of the stops can be determined from the foreknowledge of shrinkage and weight loss of the composite and a knowledge of the density of the carbonized and heat-treated fiber. More specifically, fiber volume may be determined from the ratio of the carbonized and heat-treated fiber density. These 2.7 inch high stabilized PAN substrates shrank about 18 percent in the thickness direction and about 10 percent diametrically after carbonization and heat-treatment. The shaped substrates were successfully densified in a free-standing configuration to 1.75 g/cm³ density. Final part structural integrity was excellent.

Another important starting material used in the practice of the present invention is pitch mat. The following Example 7 illustrates the use of this material and demonstrates an ability to obtain shaped substrates having very low fiber volumes.

EXAMPLE NO. 7

Pitch mat (UCC VMA type) was cut into 8"×8" panels. Resin coating was achieved by spraying each side of the panel with a diluted solution of Fiberite Karbon 700R furane resin. The furane resin solution dilution for spraying was accomplished utilizing 4 parts acetone to one part resin solution (56.7% solids). Panel resin content was determined to constitute 35.9% of the panel weight after 5 days of air drying. Sufficient coated pitch mat panels were assembled, one on top of another, to permit press bonding of the material into a rigidized panel containing 5% fiber volume. Mechanical stops (spacers) were placed between preheated (225° F.) press platens and the assembled material was inserted into the press. Sufficient pressure was applied by the press to close the platens and retain them at the mechanical stops. Platen temperatures were retained at 225° F. for one hour and then raised to 360° F. After retention of temperature at 360° F. for one hour, the press was cooled down and the part removed from examination.

The uneven edges of the press cured panel were machined flat and panel density was determined to be 0.142 gms/cc. Machined panel dimensions were 8"×8"×0.728" thick. Fiber volume was at the desired 5% level. The part was rigid and visually free of delaminations or cracks. X-ray analysis indicated no delaminations but variable density gradation in the thickness direction. This was somewhat expected since pitch mat exhibits variation in bulk density throughout a given roll length. Press bonded panel resin content was calculated to be 34.2% of the panel weight assuming all press bonding weight loss experienced was volatiles released from the resin during bonding. Nominal substrate porosity was calculated to be on the order of 91.4%.

The end products of the present invention, as produced by the methods illustrated in the foregoing examples, uniformly exhibit superior mechanical properties. For example, actual testing of various composite articles produced by the method of the invention exhibited the following composite mechanical properties:

| Property Tested | Result Ranges |
| --- | --- |
| (a) Edge Flex | 8,737–17,346 PSI |
| (b) Flat Flex | 8,108–16,466 PSI |
| (c) Interlaminar Shear | 1900–3975 PSI |
| (d) Izod Impact St'g | 0.324–1.53 ft Lbs/In |
| (e) Edge Compressive | 9,867–22,707 PSI |
| (f) Flat Compressive | 12,400–23,670 PSI |

The teachings and equipment for accomplishing the aforementioned tests are well known to those skilled in the art and need not be discussed herein.

An important product of the present invention is the composite article made up of stabilized PAN fibers. This article is uniquely characterized by having the individual fibers thereof interlocked together by mating deformations formed in the fibers at their crossover points, by material fusion at the fiber crossover points, by a carbonaceous binder deposited at spaced apart bonding site and by a uniform coating of pyrolytic material encapsulating the fibers at their crossover points. Such a product is both highly novel and extremely useful in many industrial and aerospace applications.

Another important product of the method of the present invention is a shaped precursor article, or substrate, capable of being densified in a freestanding configuration by the interstitial deposition of pyrolytic material as by CVD processing. This interim product is quite rigid and exhibits the unique capability of being able to withstand substantial internal and external stresses during full or partial densification. This precursor article can be freely handled and transported and can readily be densified in remotely located vacuum deposition furnaces without the need for bulky and expensive holding fixtures.

Having now described the invention in detail in accordance with the requirements of the patent statutes, those skilled in this art will have no difficulty in making changes and modifications in the individual parts of their relative assembly in order to meet specific requirements or conditions. Such changes and modifications may be made without departing from the scope and spirit of the invention, as set forth in the following claims.

We claim:

1. A method of making a carbon composite product comprising the steps of:
   (a) selectively depositing a precisely determined, limited amount of a carbonaceous binder material onto the fibers of a compressible fibrous material;
   (b) constructing a basic substrate having a volume greater than the volume of the final product, said amount of binder material contained in said basic substrate being limited to between approximately 1.0 weight percent and approximately 15.0 weight percent;
   (c) subjecting said basic substrate to controllable external pressures of between about 50 pounds per square inch and about 350 pounds per square inch at a predetermined elevated temperature of between approximately 225° F. and approximately 410° F. to compress said basic substrate into a shaped substrate having a known volume and a shape substantially corresponding to the shape desired of the final product, whereby said fibers are bonded together at a multiplicity of spaced apart bonding sites, said fiber portions disposed intermediate said bonding sites being free to move in response to stresses imparted to said shaped substrate, said shaped substrate thus formed being rigid, easily handleable and transportable and being capable of further processing without the need for holding fixtures or other means of external support;
   (d) subjecting said shaped substrate in a free standing configuration to elevated temperatures while controllably depositing pyrolytic material interstitially thereof, whereby said carbonaceous binder material is carbonized and said fibers are permanently bonded together by said pyrolytic material; and
   (e) continuing said interstitial deposition of pyrolytic material until the desired final product density is achieved.

2. A method of making a product as defined in claim 1 in which the fiber volume of said shaped substrate is between approximately 5 volume percent and approximately 80 volume percent and the fiber volume of said final product is between approximately 5 volume percent and approximately 40 volume percent.

3. A method of making a product as defined in claim 1 in which said compressible fibrous material is selected from the group consisting of wool, rayon, polyacrylonitrile and pitch fibers and in which the amount of binding material contained in said final product is between approximately 0.5 weight percent and approximately 4.0 weight percent.

4. A method of making a product as defined in claim 1 including the interim step of heat treating said shaped substrate to a temperature of approximately 1600° C. to fully carbonize, purify and provide further dimensional stability to said shaped substrate prior to depositing pyrolytic material interstitially thereof.

5. A method of making a carbon composite product comprising the steps of:
   (a) forming a basic substrate from a multiplicity of stabilized polyacrylonitrile fibers, said basic substrate having a volume greater than the volume of the end product;
   (b) selectively depositing a precisely determined, small quantity of a carbonaceous binder material onto said fibers at a multiplicity of spaced apart bonding sites dispersed throughout said basic substrate, said amount of binder material contained in said basic substrate being limited to between approximately 1.0 weight percent and approximately 15.0 weight percent;
   (c) subjecting said basic substrate to controllable external pressures of up to 5,000 psi at a temperature of between approximately 300° F. and approximately 410° F. to compress said basic substrate into a shaped substrate having a fiber volume of between about 40 percent and about 80 percent and a shape substantially corresponding to the shape desired of the end product whereby adjacent fibers within said shaped substrate will be crimped and lightly fused together at their crossover points thereby interlocking them together and whereby said fibers will be further bonded together at bonding sites by said binder material, said shaped substrate thus formed being capable of further processing without the need of external fixturing means to retain its shaped configuration;

(d) pyrolyzing said shaped substrate to carbonize said binder material and form a carbon fibrous substrate; and (e) maintaining said carbon fibrous substrate in the presence of a carbonaceous gas at a temperature of between approximately 1900° F. and approximately 2300° F. to deposit pyrolytic carbon interstitially in said carbon fiberous substrate, the fiber volume of said product thus produced being between about 20 percent and about 40 percent.

6. A method of making a carbon composite product as defined in claim 5 in which said multiplicity of polyacrylonitrile fibers are in the form of a plurality of sheets of fabric material and in which said carbonaceous binder material comprises a carbonizable resin, said resin being deposited upon the surfaces of said fabric sheets at a multiplicity of spaced apart bonding sites and said basic substrate being formed by stacking a plurality of said fabric sheets.

7. A method of making a precursor substrate for subsequent densification with pyrolytic carbon without the need for holding or shape retaining fixtures to produce a carbon composite final product comprising the steps of:

(a) selectively depositing a precisely determined, small amount of a resin material onto a multiplicity of polyacrylonitrile fibers at spaced apart bonding sites, said fibers having been oxidized stabilized in a manner whereby the fibers retain thermoplasticity at a temperature of between 300° F. and 410° F.;

(b) forming said multiplicity of fibers into a basic substrate having a volume greater than the volume of the end product, said amount of resin material contained in said basic substrate being limited to less than about 15.0 weight percent;

(c) subjecting said basic substrate to controllable external pressures at a temperature of between approximately 300° F. and approximately 410° F. into a shaped substrate having a fiber volume of between about 40 percent and about 80 percent and a shape substantially corresponding to the shape desired of the end product to crimp and lightly fuse together adjacent thermoplastic fibers at their crossover points whereby said fibers will be interlocked together at their crossover points and will be further bonded together by said resin at said bonding sites; and (d) pyrolyzing said shaped substrate to form a carbon fibrous substrate having open porosity conductive to interstitial deposition therewithin of a pyrolytic material.

8. A composite article comprising a multiplicity of intercrossing fibers joined together at spaced apart bonding sites by a carbonaceous binder material, said individual fibers being uniformly coated with a pyrolytic material and being further joined together at their crossover points by a coating of pyrolytic material, said article having a fiber volume of between approximately 5 volume percent and approximately 40 volume percent, the amount of said binder material being limited to betweeen approximately 1.0 weight percent and approximately 15.0 weight percent.

9. A composite article comprising a multiplicity of intercrossing stabilized PAN fibers interlocked together with adjacent fibers by:

(a) mating deformations formed in the fibers at their crossover points within the article;

(b) by a carbonaceous binder material deposited at a multiplicity of spaced apart bonding sites within the article said carbonaceous binder being limited to between approximately 1.0 weight percent and approximately 15.0 weight percent; and by (c) a coating of pyrolytic material substantially encapsulating said fibers at their crossover points within the article.

10. A composite article as defined in claim 9 in which said fibers are further interlocked together through material fusion at said crossover points.

11. A shaped precursor article adapted to be densified in a free standing configuration by the deposition of pyrolytic material comprising a multiplicity of fibers forming an article of high open porosity and a known fiber volume of between about 40 percent and about 80 percent wherein said fibers are bonded together at a multiplicity of spaced apart bonding sites by a carbonaceous binder material, said fiber portions disposed intermediate said bonding sites being free to move in response to stresses imparted to said shaped article, the amount of said binder material being less than 15.0 weight percent.

12. A composite article as defined in claim 8 in which said carbonaceous binder material consists of a polyimide resin.

13. A composite article as defined in claim 8 in which said carbonaceous binder material consists of a phenolic resin.

14. A composite article as defined in claim 8 in which said carbonaceous binder material consists of a furfural resin.

15. A composite article as defined in claim 8 in which said intercrossing fibers are in the form of a plurality of layers of a fabric material having a multiplicity of interwoven carbon fibers.

16. A composite article as defined in claim 8 in which said intercrossing fibers are in the form of a multiplicity of randonly oriented carbon fibers.

* * * * *